United States Patent [19]

Thompson

[11] B 3,921,217

[45] Nov. 18, 1975

[54] THREE-LEGGED MAGNETIC RECORDING HEAD USING A MAGNETORESTIVE ELEMENT

[75] Inventor: David A. Thompson, Somers, N.Y.

[73] Assignee: International Business Machines Corporation, Armonk, N.Y.

[22] Filed: June 20, 1973

[21] Appl. No.: 371,787

[44] Published under the Trial Voluntary Protest Program on January 28, 1975 as document no. B 371,787.

Related U.S. Application Data

[63] Continuation of Ser. No. 212,591, Dec. 27, 1971, abandoned.

[52] U.S. Cl. .................. 360/113; 360/119; 360/122

[51] Int. Cl.$^2$ ...................... G11B 05/12; G11B 5/22

[58] Field of Search ........... 179/100.2 CH, 100.2 C, 179/; 340/174.1 F; 346/74 MC; 360/113, 119, 121, 125, 122

[56] References Cited

UNITED STATES PATENTS

| | | | |
|---|---|---|---|
| 2,712,601 | 6/1955 | Reinwald | 179/100.2 CH |
| 3,163,721 | 12/1964 | Kuhrt et al. | 179/100.2 CH |
| 3,355,727 | 11/1967 | Gaubatz | 179/100.2 C |
| 3,493,694 | 2/1970 | Hunt | 179/100.2 CH |
| 3,568,180 | 2/1971 | Rosch | 179/100.2 CH |
| 3,624,313 | 11/1971 | Dekoster | 179/100.2 CH |
| R26,610 | 6/1969 | Dekoster | 179/100.2 CH |

*Primary Examiner*—Alfred H. Eddleman
*Attorney, Agent, or Firm*—George Baron; Graham S. Jones II

[57] ABSTRACT

A magnetoresistive recording head for writing information onto a magnetic tape or similar recording medium and for reading such information, wherein the thin magnetoresistive element is protected from tape wear by employing a magnetically permeable element between the tape and the magnetoresistive element so that recording can take place without proximity between tape and sensor. Additionally, the magnetoresistive element is surrounded by the yoke of the recording head in such a manner that the element is effectively out of the magnetic field of view of the magnetically recorded data until such data is directly under the magnetic element. Consequently, the resolution of the recording head is substantially increased.

28 Claims, 5 Drawing Figures

THREE-LEGGED MAGNETIC RECORDING HEAD USING A MAGNETORESTIVE ELEMENT

This is a continuation, of application Ser. No. 212,591 filed Dec. 27, 1971 now abandoned.

BACKGROUND OF THE INVENTION

Recording heads, wherein the sensor of the data stored as magnetic fields in a magnetic medium is a magnetoresistive element, are available as evidenced by U.S. Pat. No. 3,274,575 to deKoster which issued Sept. 20, 1966 and U.S. Pat. No. 3,493,694 which issued to Hunt on Feb. 3, 1970 . Magnetoresistive sensors have found favor in the recording art because they are speed independent magnetic flux detectors. In conventional recording heads, the faster the heads travel past the information-bearing tape, the higher the output signal of the head. In some applications, one wants high flux sensing at slow speeds and, for such applications, one relies on a magnetoresistive sensor. However, many of the known magnetoresistive recording devices have shortcomings that do not lend themselves for use as practical recording heads, particularly when they are manufactured as thin film structures.

One typical magnetoresistive head comprises a split core of magnetic material having two air gaps wherein a magnetoresistive sensing strip is placed in the rear gap of the core while the front gap senses the information-bearing tape. In this type of detector, the front gap senses all flux, that which is stray or ambient as well as that which is information bearing, so that the resolution is poor. Additionally, such split core heads produce two pulses per transition, requiring expensive and sophisticated filtering for detecting the pulse of interest. Moreover, a split core head does not lend itself to thin film manufacture in that such thin magnetoresistive film, for proper operation, must be fabricated perpendicular to its supporting substrate, which is virtually impossible for practical purposes.

Another typical prior art recording head using a magnetoresistive element employs the latter as a thin stripe that is embedded either vertically or horizontally on a supporting block and such stripe must be essentially in contact with the moving magnetic tape in order to maximize resolution. It has been found that (1) when the vertically disposed magnetoresistive stripe is used, high resolution of the head requires an accuracy of stripe fabrication which is unattainable, in practice, and (2) when the stripe is disposed horizontally, the moving tape erodes such stripe so as to considerably shorten the life of the sensing element of the recording head.

To overcome the above noted defects, a novel head has been devised wherein the magnetic stripe or thin element is located as a bridge between two magnetically permeable legs and the lower of the two legs is in contact with the moving tape surface. The magnetically permeable lower leg serves to carry the magnetic data recorded in the tape to the magnetoresistive element that is distant from the tape so that wear of the leg can be tolerated without diminishing the life of the sensing magnetoresistive element. The two magnetically permeable legs are in the middle of a yoke of magnetic material so that a substantially three-legged yoke is defined, namely, the two outer legs of the yoke and the middle "leg" comprising the split vertically disposed magnetically permeable elements and their bridging magnetoresistive element.

This configuration has the additional advantage of employing the outer legs of the yoke as a means of obscuring or blocking off any magnetic information on the moving tape so that sensing of data only takes place when that data is immediately below the middle leg of the yoke. Consequently, the present head greatly increases the resolution of the head as well as its life. Finally, by employing a nonmagnetic metallic conductor, i.e., copper, between the central leg and the outer legs of the yoke, current can be sent through the head through the copper, by-passing the magnetoresistive element, so that the novel head can be employed for writing as well as for reading. As will be shown hereinafter, such advantages are obtained consistent with making the novel head by thin film techniques so that small size as well as improved operation are now available to the recording industry.

Consequently, it is an object of this invention to provide a magnetoresistive head that is capable of writing data onto as well as reading data from magnetic tapes, discs, or the like.

It is yet another object to achieve the above-noted object employing thin film technology in the fabrication of the recording head.

It is still another object to fabricate a thin film magnetoresistive recording head having large wear tolerance.

A further object is to provide a recording head having high resolution as well as large wear tolerance.

The foregoing and other objects, features and advantages of the invention will be apparent from the following more particular description of preferred embodiments of the invention as illustrated in the accompanying drawings.

Figure 1:
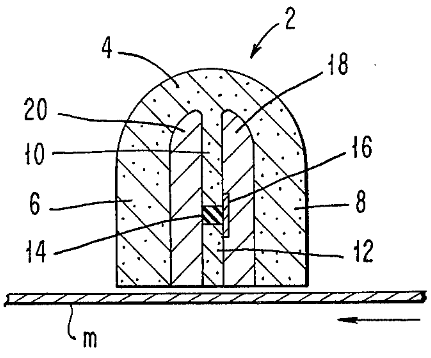
FIG. 1 is a cross-section of a preferred embodiment of the invention.

The recording head 2 shown in FIG. 1 comprises a yoke 4 having legs 6 and 8 and a split central leg composed of upper portion 10 and lower portion 12 connected together by a non-magnetic spacer 14. For magnetic purposes, the three legs, namely, leg 6, leg 8, and split leg (10 and 12) are made of magnetically permeable material, such as permalloy or ferrite. For magnetic purposes, the spacer layers, namely layer 14, layer 18, and layer 20 are made of non-magnetic materials, such as copper or glass. For electrical purposes, the magnetoresistive element 16 must not contact any other electrically conductive layer in the cross-section of FIG. 1. Thus, if electrically conductive materials are chosen for magnetic elements 10 and 12, or for spacer elements 14 or 18, then additional thin insulating layers, not shown, must be used to isolate the magnetoresistive element 16. When the head is to be used for writing onto a magnetic medium, one of the spacer layers, such as layer 20, which does not contact the magnetoresistive element 16, can be electrically conductive. A thin ferromagnetic film 16, having low anisotropy and a high magnetoresistance coefficient, such as permalloy, serves as the magnetoresistive sensing element of the head 2. Surrounding the magnetoresistive element 16 and the central leg on both sides are fillers 18 and 20. Such fillers not only give body to the head but, as will be described hereinafter, can serve as electrical conductors when the head 2 is used for writing or for applying a biasing magnetic field to the magnetoresistive element 16.

Figure 2:
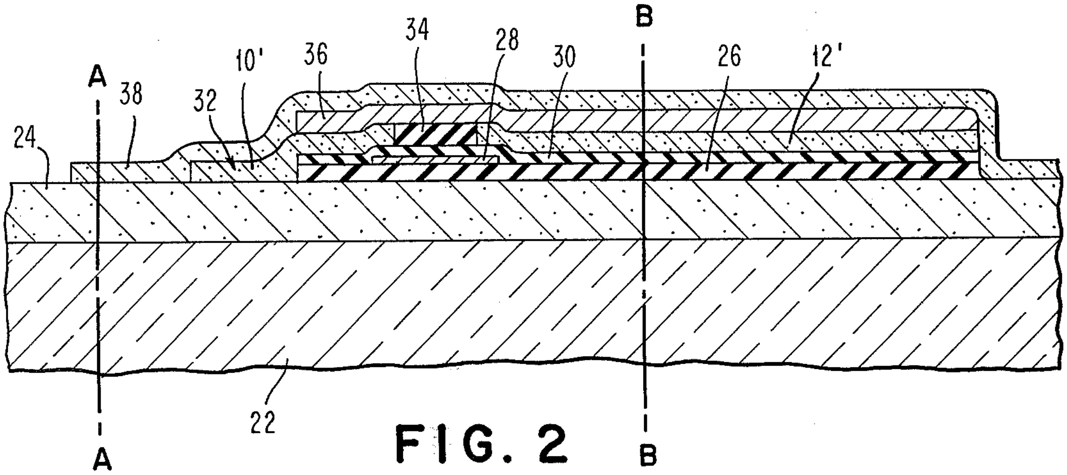
FIG. 2 is a cross-section of the novel recording head illustrating the thin film layers that comprise such head.

FIG. 2 illustrates one manner in which the head 2 of FIG. 1 is fabricated as a multilayer thin film using conventional vapor deposition and electroplating techniques. On a suitable substrate 22 of glass, $SiO_2$ or the like, is vapor deposited a first layer 24 of permalloy, over which is deposited an insulating layer 26, $SiO_2$ being an acceptable material to serve as such insulating layer, though other equivalent insulators can be used. Magnetoresistive element 28 is laid down on such insulating layer 26, followed by the deposition of a second insulating layer 30 to envelop magnetoresistive element 28. A second layer of permalloy 32 is deposited onto the first permalloy layer 24 and over the second insulating layer 30, save for a window 34 which is blocked off during the deposition of the second layer 32 of permalloy so that no permalloy is immediately over a portion of magnetoresistive element 28, leaving effectively an upper leg 10' and a lower leg 12'. After this window 34 is filled with insulating material, similar to that of layers 26 and 30, a conducting strip 36 is deposited that is substantially coextensive with the insulating layers 26 and 30 and is made of any conducting, non-magnetic material, i.e., copper. A final layer 38 of permalloy overlies conducting strip 36 as shown, making contact also with second layer 32 of permalloy as well as with the first permalloy layer 24. After the last layer of permalloy has been deposited, the entire assembly is cut and polished so that everything to the left of line A—A and to the right of the dotted line B—B of FIG. 2 is removed, and the head 2 is complete save for the electrical contacts and leads that are to be attached to them.

It should be noted that spacer 34 need not be distinct from spacer 36. They can be deposited as a single layer, with a resulting ripple in the surface contour between spacer layer 36 and layer 38. This alternate technique can be readily relied upon when the thickness of layer 32 is less than the thickness of layer 36, assuring that the depth of window 34 will be filled.

FIG. 1 depicts a reading head more likely to be used as a bulk type head wherein, for symmetry, two fillers 18 and 20 are used. But in the thin film version of the novel head of FIG. 2, only one strip 36 of electrically conducting material is used. The thicknesses of the deposited films or layers of an operative head 2 made by thin film technology are as follows:

| | | |
|---|---|---|
| Permalloy layer 24 | ~ | 30,000A |
| Insulating $SiO_2$ layer 26 | ~ | 5,000A |
| Magnetoresistive layer 28 | ~ | 200A |
| Insulating $SiO_2$ layer 30 | ~ | 800A |
| Permalloy layer 32 | ~ | 2,000A |
| Copper layer 34 | ~ | 5,000A |
| Permalloy layer 36 | ~ | 30,000A |

Figure 3:
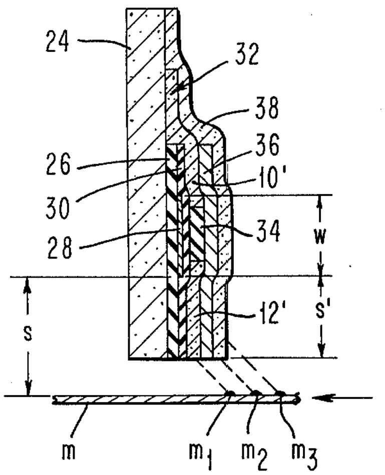
FIG. 3 is a schematic showing of how the width of the magnetoresistive element and its distance from a moving tape are related to the resolution of a recording head.

As seen in FIG. 3, when a recording medium m, which could be tape, a disc file, wire, or the like, passes underneath the head, it is desirable that the head 2 have high linear resolution. If one were to plot the output voltage signal of a read head as a function of the number of magnetic bits per inch, the value of the density of the data bits (how many bits per inch) at the half-amplitude (half-way between zero voltage output and maximum voltage output) value of this plot is a measure of the linear resolution of the head. For the vertical head of the type described in the above-noted Hunt patent, the density of half-amplitude $\cong 1/w+2s$, where $w$ is the width of his magnetoresistive element and $s$ is the shortest distance from that element to medium $m$. The dimension $w$ is limited by the minimum attainable linewidths and s is limited by the combined polishing, wear, and flying height tolerances. Modern technology does not allow a resolution greater than a few thousand bits per inch. For the head of FIG. 3, however, the linear resolution is determined primarily by the thicknesses of spacer layers 26, 30, and 36 and of magnetic layer 12'. For a properly proportional head, the resolution will be approximately that of a conventional inductive head with a gap width of half the sum of the thicknesses of layers 26, 30, 12', and 36. Since these layers are very thin, this resolution is high (~ 30,000 bits/inch). That the above considerations are valid may be seen from FIG. 3. The permalloy legs 24 and 38 reduce the effective magnetic field of view of the magnetoresistive element 28. Thus magnetic bits $m_1$, $m_2$, or $m_3$ are shielded from magnetic sensing by element 28 until they are individually under that element 28. As recording medium m moves past the immediate range of magnetoresistive element 28, the permalloy leg 24 prevents magnetic information now to the left of element 24 from being sensed by element 28.

An advantage of the head of FIG. 3 is that the properties of linear resolution and wear tolerance can be optimized separately. Thus, the tolerance for wear is determined by the distance $s'$, which can be worn away before the element begins to suffer damage. The linear resolution is mostly determined by thicknesses of layers 26, 30, 12' and 36, as noted above. The resolution of the head is only weakly dependent on the thicknesses of the outer magnetic legs 24 and 38, so that they could be massive blocks which replace the substrate 22 or are otherwise part of the mechanical package of the head.

Figure 4:
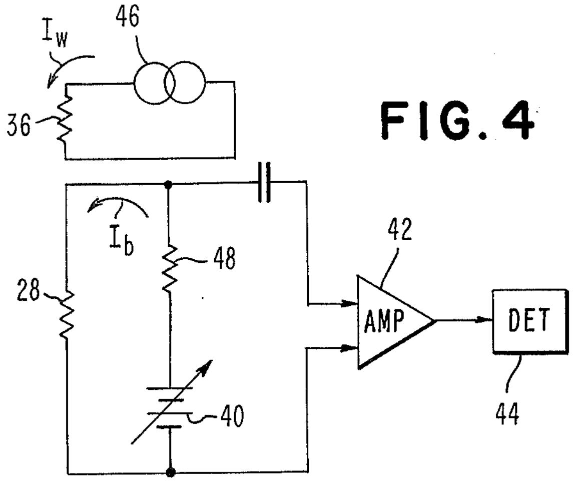
FIG. 4 is an example of a read-write circuit usable with the recording head forming the present invention.
Figure 5:
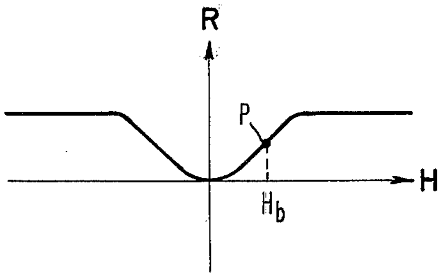
FIG. 5 is a generalized resistance-magnetic field plot of a magnetoresistive element.

The manner in which the reading head 2 is employed for reading and writing is better seen in conjunction with FIGS. 4 and 5. In FIG. 4, the magnetoresistive element 28 is shown illustratively as a resistor 28. The magnetoresistive element 28 is connected to a battery 40 at one end and at the other end to a resistive element 48, which together constitute a source of bias current $I_b$ through element 28, so that the changes of resistance of element 28 will appear as a signal voltage ($I_b$) ($\Delta R$) at the amplifier 42. The resistance change of element 28 is shown as a function of magnetic field in FIG. 5. In order that a small magnetic signal from the medium m will produce the largest and most linear resistance change, the element 28 should be exposed to a constant magnetic bias field $H_b$. This can be produced by a current $I_w$ flowing in the spacing layer 36, shown as a resistor 36 in FIG. 4.

Thus the head requires two types of bias, the current bias $I_b$, and the magnetic bias $H_b$ (which can be produced by a current $I_w$). In some cases, one can connect elements 28 and 36 in series to accomplish both types of bias with a single current.

In some types of digital magnetic recording, linearity is not required, and a magnetic bias point other than the point of maximum slope $\Delta R/\Delta H$ will be chosen.

When the head 2 of FIG. 3 is to be used to write, a generator 46 applies write current $I_w$ through strip 36, such current $I_w$ being much greater than $I_b$ so as to apply a large H to the moving recording member m. In the present case, the width of the written track on the medium m is greater than the width of the information being read. Reading width is dependent on the length of magnetoresistive element 16 or 28 whereas writing width depends on the lengths of copper condutor 18, 20 or 36 and magnetic layers 24 and 38. In the instant case, looking perpendicularly to the plane of the drawing of FIGS. 1 and 3, the length of magnetoresistive element 16 is less than the lengths of legs 6 and 8 or fillers 18 and 20; or the length of element 28 is less than the length of permalloy layers 24, 32, 38 and copper filler 36. Consequently, the novel recording head 2 forming the present invention has the capability of writing widely and reading narrowly, and such capability eases the machanical tolerances in a recording system.

In summary, a three-legged recording head, capable of being built either as a unitary bulk unit or by thin film technology, has been provided that lends itself to both reading and writing, where the width of the magnetic information recorded on a recording member is greater than the width of magnetic information read by that same head. The head, using a magnetoresistive element, has a large wear tolerance and high resolution. Since the heads 2 can be made 10 mils wide or less, they lend themselves for use wherever high density magnetic recording is used.

What is claimed is:

1. A head for a magnetic recording medium comprising a yoke having two spaced apart magnetically permeable legs, a third magnetically permeable leg, depending from said yoke, between said first two legs and being split so as to provide an upper member and a lower member, said lower member having its lower extremity in flux-coupling relationship to said magnetic medium, a non-magnetic gap inserted between said upper and lower members, and a magnetoresistive element between said members across said gap, the width w of said element being greater than the distance between said third magnetically permeable leg and either spaced apart leg of said yoke.

2. The head of claim 1 including a non-magnetic, electrically conducting material imbedded between said magnetoresistive element and an adjacent leg.

3. A head for a magnetic recording medium comprising a magnetically permeable leg split into an upper member and a lower member with the latter in flux-coupling relationship to said magnetic medium, a high reluctance gap material between said members so that the latter form a continuous leg, a magnetoresistive element on said high reluctance gap material and bridging said members, a non-magnetic electrically conductive material adjacent to said magnetoresistive element and coextensive with said lower member, means for applying electrical current through said non-magnetic electrically conductive material so as to apply a magnetic bias to said magnetoresistive element, and magnetically permeable elements spaced apart from said split leg but magnetically coupled thereto to serve as a return flux path for said split leg, the width w of the magnetoresistive element being greater than the spacing between said split leg and either of said magnetically permeable elements.

4. The head of claim 3 wherein the length of the non-magnetic electrically conductive material is greater than the length of the magnetoresistive element.

5. The head of claim 3 wherein said non-magnetic electrically conductive material is copper.

6. The head of claim 3 having additional means for applying a write current, larger than said bias current, through said non-magnetic electrically conductive material for writing information onto said magnetic medium.

7. The head of claim 1 wherein said magnetoresistive element is positioned between the outer magnetically permeable legs so that said magnetoresistive element is substantially shielded from all magnetic data on said recording medium except for that data that is in the plane of said magnetoresistive element.

8. A head for a magnetic recording medium comprising a plurality of thin films built up in the following order, namely, a first layer of permalloy, a first layer of insulation thereon, a layer of magnetoresistive material over a portion of said insulation, a second layer of insulation covering said magnetoresistive material and coextensive with said first layer of insulation, a second layer of permalloy overlying all previous layers but having an opening therein in the vicinity of said second insulating layer over said magnetoresistive element, an insulating material filling said opening, a layer of non-magnetic, electrically conductive material coextensive with said second layer of permalloy, a third layer of permalloy over said last layer and coextensive therewith, and all of said coextensive layers being ground smooth to provide a smooth plane perpendicular to the direction of said coextensive layers, so that said smooth plane can be in flux-coupling relationship with said magnetic medium.

9. The head of claim 8 having means for applying electrical energy to bias said magnetoresistive element.

10. The head of claim 8 having means for applying writing current to said non-magnetic electrically conducting material.

11. The head of claim 8 wherein said first and third permalloy layers are of the order of 30,000A, the insulating layers are of the order of 5,000A and 800A, the second permalloy layer of the order of 2,000A, the non-magnetic electrically conductive material is of the order of 5000A and said magnetoresistive element is of the order of 200A.

12. A head for sensing magnetic data from a magnetic medium, said data recorded at a rate of about 30,000 flux changes per inch, said head comprising:

a first magnetically permeable member, said member including an inner face and an end portion, said end portion to be in flux-coupling relationship to said medium, non-magnetic material adjacent the face at the end portion of said first member, a magnetoresistive sensing element, said element in magneto-sensing relationship with said medium and within said non-magnetic material and out of contact with said first permeable member, and a second magnetically permeable member, said member including an inner face, said face adjacent said non-magnetic material and substantially parallel with the inner face of the end portion of said first permeable member, said second member also being out of contact with said magnetoresistive element, said first and second members bracketing said magnetoresistive element and having their inner faces separated at the end portion by a distance which is less than the width of the magnetoresistive element.

13. The sensing head of claim 12 including a non-magnetic, electrically conducting material adjacent said second magnetically permeable member and in flux-coupling relationship with said magnetic medium, said non-magnetic, electrically conducting material serving to carry current for writing data in said storage medium.

14. A three-legged thin film head for interacting with a magnetic recording medium wherein each leg is made of magnetically permeable material and the ends of the legs farthest from said medium being magnetically coupled together, each of the outer ones of said legs providing shielding of the space therebetween occupied by the inner leg, and said outer legs being separated from each other by a given distance *d*, and magnetoresistive material forming a portion of said inner leg and extending along the width w thereof towards said medium, said width w of said portion being greater than said given distance d.

15. The head of claim 14 including a non-magnetic, electrically conducting material between said magnetoresistive element and an adjacent leg.

16. A three-legged thin film head for interacting with a magnetic recording medium wherein each leg extends in a plane substantially normal with respect to said magnetic medium and is made of magnetically permeable material, said legs being joined together at the ends thereof farthest from said magnetic medium, each of the outer ones of said legs comprising a shielf for shielding magnetic fields outside of said legs from the space therebetween, said outer legs defining a gap on the order of a few microns and less and being spaced from the inner one of said legs, a thin film magnetoresistive member adjacent to and coupled with said inner leg, said magnetoresistive member extending along a plane substantially normal to said magnetic medium and substantially parallel to said legs.

17. Apparatus in accordance with claim 16, wherein said magnetoresistive member includes a ferromagnetic material, wherein the path of the magnetic field of said inner leg from said medium is completed through said ferromagnetic material.

18. A magnetic head containing two outer permeable shielding members, each shielding member having one face essentially in proximity with the magnetic recording medium and each having one inner face essentially perpendicular to said magnetic recording medium, said inner faces being substantially parallel, and defining a magnetic gap, and within said gap a magnetically permeable member containing a highly permeable, thin film magnetoresistive layer, said magnetoresistive layer being substantially aligned in the direction of its width *w* with a plane essentially parallel to said inner faces of said shielding members, and in a flux-coupling relationship with said magnetic recording medium, said gap being less than said width *w*.

19. A magnetic head for communicating with a magnetic recording medium including two outer permeable shielding legs, each said leg having a surface on an end thereof adapted to be closest to said recording medium, and said legs each having confronting faces substantially perpendicular to said medium, said confronting faces defining a magnetic gap between said shielding legs, a magnetically permeable magnetoresistive member located within said gap, said magnetoresistive member extending in the direction of its width *w* along a plane substantially normal to said magnetic medium and substantially parallel to said confronting faces, said gap being less than said width *w*.

20. A three-legged thin film head for interacting with a magnetic recording medium wherein each leg extends in a plane substantially normal with respect to said magnetic medium and is made of magnetically permeable material, said legs being joined together at the ends thereof farthest from said magnetic medium, each of the outer ones of said legs comprising a shield for shielding magnetic fields outside of said legs from the space therebetween, said outer legs defining a gap being spaced from the inner one of said legs, a thin film magnetoresistive member adjacent to and coupled with said inner leg, said magnetoresistive member extending in the direction of its width w along a plane substantially normal to said magnetic medium and substantially parallel to said legs, said width w exceeding said gap between said legs.

21. Apparatus in accordance with claim 20, wherein said magnetoresistive member includes a ferromagnetic material, wherein the path of the magnetic field of said inner leg from said medium is completed through said ferromagnetic material.

22. A magnetic head containing two outer permeable shielding members, each shielding member having one face adopted to be essentially in proximity with a magnetic recording medium and each having one inner face essentially perpendicular to said magnetic recording medium, said inner faces being substantially parallel, and defining a magnetic gap, and within said gap a magnetically permeable member containing a highly permeable, thin film magnetoresistive layer, said magnetoresistive layer being substantially aligned with a plane essentially parallel to said inner faces of said shielding members, and in a flux-coupling relationship with said magnetic recording medium, said gap being on the order of a few microns and less.

23. A magnetic head for communicating with a magnetic recording medium including two outer permeable shielding legs, each said leg having a surface on an end thereof adapted to be closest to said recording medium, and said legs each having confronting faces substantially perpendicular to said medium, said confronting faces defining a magnetic gap between said shielding legs, a magnetically permeable magnetoresistive member located within said gap, said magnetoresistive member extending along a plane substantially normal to said magnetic medium and substantially parallel to said confronting faces, said gap being on the order of a few microns and less.

24. A three-legged thin film head for interacting with a magnetic recording medium wherein each leg extends in a plane substantially normal with respect to said magnetic medium and is made of magnetically permeable material, said legs being joined together at the ends thereof farthest from said magnetic medium, each of the outer ones of said legs comprising a shield for shielding magnetic fields outside of said legs from the space therebetween, said outer legs defining a gap narrow enough for providing a resolution of over 10,000 bits/inch being spaced from the inner one of said legs, a thin film magnetoresistive member adjacent to and coupled with said inner leg, said magnetoresistive member extending along a plane substantially normal to said magnetic medium and substantially parallel to said legs.

25. Apparatus in accordance with claim 24, wherein said magnetoresistive member includes a ferromagnetic material, wherein the path of the magnetic field of said inner leg from said medium is completed through said ferromagnetic material.

26. A magnetic head containing two outer permeable shielding members, each shielding member having one face adopted to be essentially in proximity with a magnetic recording medium and each having one inner face essentially perpendicular to said magnetic recording medium, said inner faces being substantially parallel, and defining a magnetic gap, and within said gap a magnetically permeable member containing a highly permeable, thin film magnetoresistive layer, said magnetoresistive layer being substantially aligned in the direction of its width w with a plane essentially parallel to said inner faces of said shielding members, and in a flux-coupling relationship with said magnetic recording medium, said gap being narrow enough to provide a resolution of over 10,000 bits per inch.

27. A magnetic head for communicating with a magnetic recording medium including two outer permeable shielding legs, each said leg having a surface on an end thereof adapted to be closest to said recording medium, and said legs each having confronting faces substantially perpendicular to said medium, said confronting faces defining a magnetic gap between said shielding legs, a magnetically permeable magnetoresistive member located within said gap, said magnetoresistive member extending in the direction of its width w along a plane substantially normal to said magnetic medium and substantially parallel to said confronting faces, said gap being very narrow for providing a resolution of over 10,000 bits per inch.

28. A head in accordance with claim 22 wherein said head is adapted for reading a magnetic recording medium having digital data bits recorded at closely spaced apart locations thereon, said head being composed of thin films built up in the following order, one of said shielding members comprising a first shielding layer of permeable material, a first layer of high reluctance material deposited thereon, said magnetoresistive layer comprising magnetically permeable material deposited on and lying over a portion of said high reluctance material, a second layer of high reluctance material deposited over said magnetoresistive layer and said first layer of high reluctance material, the second of said shielding members comprising a second shielding layer of permeable material overlying all previous layers, whereby said magneto resistive layer is effectively shielded from bits adjacent to a bit at said magnetic gap.

* * * * *